(12) United States Patent
Camaisa et al.

(10) Patent No.: US 8,219,822 B2
(45) Date of Patent: Jul. 10, 2012

(54) SYSTEM AND METHOD FOR BLOCKING UNAUTHORIZED NETWORK LOG IN USING STOLEN PASSWORD

(75) Inventors: Allan Camaisa, Las Vegas, NV (US); Jonas Samuelsson, La Jolla, CA (US)

(73) Assignee: Anakam, Inc., Wilmington, DE (US)

( * ) Notice: Subject to any disclaimer, the term of this patent is extended or adjusted under 35 U.S.C. 154(b) by 1446 days.

(21) Appl. No.: 11/257,421

(22) Filed: Oct. 24, 2005

(65) Prior Publication Data
US 2006/0069921 A1 Mar. 30, 2006

Related U.S. Application Data

(63) Continuation-in-part of application No. 11/077,948, filed on Mar. 11, 2005, which is a continuation-in-part of application No. 10/892,584, filed on Jul. 15, 2004.

(51) Int. Cl.
*H04K 1/00* (2006.01)
(52) U.S. Cl. ............................................. 713/182; 726/4
(58) Field of Classification Search .......... 713/182–183, 713/185–186; 726/4
See application file for complete search history.

(56) References Cited

U.S. PATENT DOCUMENTS

| | | | |
|---|---|---|---|
| 5,590,199 A | 12/1996 | Krajewski et al. | |
| 5,737,421 A | 4/1998 | Audebert | |
| 5,802,176 A | 9/1998 | Audebert | |
| 5,887,065 A | 3/1999 | Audebert | |
| 5,937,068 A | 8/1999 | Audebert | |
| 5,982,898 A | 11/1999 | Hsu et al. | |
| 6,035,404 A | 3/2000 | Zhao | |
| 6,047,268 A | 4/2000 | Bartoli et al. | |
| 6,076,163 A | 6/2000 | Hoffstein | |
| 6,085,320 A | 7/2000 | Kaliski | |
| 6,130,621 A | 10/2000 | Weiss | |
| 6,157,920 A | 12/2000 | Jakobsson | |
| 6,189,098 B1 | 2/2001 | Kaliski | |
| 6,202,159 B1 | 3/2001 | Ghafir et al. | |
| 6,240,184 B1 | 5/2001 | Huynh | |
| 6,269,163 B1 | 7/2001 | Rivest | |
| 6,286,022 B1 | 9/2001 | Kaliski | |
| 6,301,362 B1 | 10/2001 | Matyas et al. | |
| 6,308,268 B1 | 10/2001 | Audebert | |
| 6,317,777 B1 | 11/2001 | Skarbo et al. | |
| 6,373,969 B1 | 4/2002 | Andrew | |
| 6,374,359 B1 * | 4/2002 | Shrader et al. | 726/5 |

(Continued)

FOREIGN PATENT DOCUMENTS
WO WO 03/007571 A1 1/2003

OTHER PUBLICATIONS

Rodry, "Cookie based authentication: is it secure ?", Published on Aug. 28, 2000, http://www.perlmonks.org?node_id=29928.*

(Continued)

*Primary Examiner* — Samson Lemma
(74) *Attorney, Agent, or Firm* — Kilpatrick Townsend & Stockton LLP

(57) ABSTRACT

The geographic location of a computer attempting to gain authentication to a server is obtained using the IP address of the computer, with authentication being denied if the geographic location is not approved.

19 Claims, 5 Drawing Sheets subsequent log-ins

U.S. PATENT DOCUMENTS

| | | |
|---|---|---|
| 6,389,442 B1 | 5/2002 | Yin |
| 6,393,447 B1 | 5/2002 | Jakobsson |
| 6,411,715 B1 | 6/2002 | Liskov |
| 6,429,927 B1 | 8/2002 | Borza |
| 6,434,259 B1 | 8/2002 | Hamid |
| 6,446,052 B1 | 9/2002 | Juels |
| 6,446,210 B1 | 9/2002 | Borza |
| 6,460,141 B1 | 10/2002 | Olden |
| 6,498,861 B1 | 12/2002 | Hamid |
| 6,584,505 B1 * | 6/2003 | Howard et al. ............... 709/225 |
| 6,598,072 B1 | 7/2003 | McBrearty et al. |
| 6,662,231 B1 | 12/2003 | Drosset et al. |
| 6,694,436 B1 | 2/2004 | Audebert |
| 6,700,606 B1 | 3/2004 | Borza |
| 6,721,891 B1 | 4/2004 | Borza |
| 6,751,654 B2 | 6/2004 | Massarani et al. |
| 6,760,844 B1 | 7/2004 | McCarthy et al. |
| 6,769,068 B1 | 7/2004 | Brozowski et al. |
| 6,772,954 B2 | 8/2004 | Boyer |
| 6,813,354 B1 | 11/2004 | Jakobsson |
| 6,831,980 B1 | 12/2004 | Borza |
| 6,836,845 B1 * | 12/2004 | Lennie et al. ................. 713/181 |
| 6,848,052 B2 | 1/2005 | Hamid |
| 6,857,078 B2 | 2/2005 | Colvin |
| 7,032,026 B1 * | 4/2006 | Biswas et al. ................. 709/229 |
| 7,100,049 B2 | 8/2006 | Gasparini et al. |
| 7,275,263 B2 | 9/2007 | Bajikar et al. |
| 7,345,775 B2 * | 3/2008 | Kimura ........................ 358/1.13 |
| 7,346,775 B2 | 3/2008 | Gasparinl et al. |
| 7,360,096 B2 | 4/2008 | Bracewell et al. |
| 7,418,596 B1 | 8/2008 | Carroll |
| 7,426,530 B1 | 9/2008 | Rosko et al. |
| 7,464,162 B2 | 12/2008 | Chan |
| 7,536,433 B2 | 5/2009 | Reilly |
| 7,562,222 B2 | 7/2009 | Gasparini et al. |
| 7,571,466 B2 * | 8/2009 | Mitchell et al. ................... 726/4 |
| 7,665,127 B1 | 2/2010 | Rao et al. |
| 7,676,834 B2 | 3/2010 | Camaisa et al. |
| 7,685,631 B1 | 3/2010 | Paya et al. |
| 7,725,490 B2 | 5/2010 | Hitchen et al. |
| RE41,546 E | 8/2010 | Vainstein |
| 7,822,989 B2 | 10/2010 | Libin et al. |
| 8,079,070 B2 | 12/2011 | Camaisa |
| 2001/0014895 A1 | 8/2001 | Sappal |
| 2001/0029585 A1 | 10/2001 | Simon et al. |
| 2001/0037451 A1 | 11/2001 | Bhagavatula |
| 2001/0037466 A1 | 11/2001 | Fukutake et al. |
| 2001/0044896 A1 | 11/2001 | Schwartz et al. |
| 2002/0029279 A1 | 3/2002 | Campbell et al. |
| 2002/0031230 A1 | 3/2002 | Sweet et al. |
| 2002/0131402 A1 | 9/2002 | Lee et al. |
| 2002/0133706 A1 | 9/2002 | Khanna et al. |
| 2002/0169961 A1 | 11/2002 | Giles et al. |
| 2002/0184496 A1 | 12/2002 | Mitchell et al. |
| 2003/0005308 A1 | 1/2003 | Rathbun et al. |
| 2003/0018707 A1 | 1/2003 | Flocken |
| 2003/0033245 A1 | 2/2003 | Kahr |
| 2003/0046551 A1 | 3/2003 | Brennan |
| 2003/0093430 A1 | 5/2003 | Mottur |
| 2003/0097573 A1 | 5/2003 | Wheeler |
| 2003/0140230 A1 | 7/2003 | De Jong et al. |
| 2003/0149900 A1 | 8/2003 | Glassman et al. |
| 2003/0159068 A1 | 8/2003 | Halpin et al. |
| 2003/0163739 A1 | 8/2003 | Armington et al. |
| 2003/0177351 A1 | 9/2003 | Skingle |
| 2003/0188186 A1 * | 10/2003 | Cherry et al. ................. 713/200 |
| 2003/0200202 A1 * | 10/2003 | Hsiao et al. ........................ 707/3 |
| 2003/0217288 A1 | 11/2003 | Guo et al. |
| 2003/0229782 A1 | 12/2003 | Robert, Jr. et al. |
| 2004/0059951 A1 | 3/2004 | Pinkas et al. |
| 2004/0098609 A1 | 5/2004 | Bracewell et al. |
| 2004/0103203 A1 | 5/2004 | Nichols et al. |
| 2004/0103297 A1 | 5/2004 | Risan et al. |
| 2004/0103300 A1 | 5/2004 | Risan et al. |
| 2004/0111621 A1 | 6/2004 | Himberger et al. |
| 2004/0123103 A1 | 6/2004 | Risan et al. |
| 2004/0136510 A1 | 7/2004 | Vander Veen |
| 2004/0139318 A1 | 7/2004 | Fiala et al. |
| 2004/0143523 A1 | 7/2004 | Pegaz-Paquet et al. |
| 2004/0168083 A1 | 8/2004 | Gasparini |
| 2004/0172535 A1 | 9/2004 | Jakobsson |
| 2004/0187018 A1 | 9/2004 | Owen et al. |
| 2004/0250076 A1 | 12/2004 | Kung |
| 2005/0015601 A1 | 1/2005 | Tabi |
| 2005/0108551 A1 * | 5/2005 | Toomey ........................ 713/185 |
| 2005/0138109 A1 | 6/2005 | Redlich et al. |
| 2005/0160042 A1 | 7/2005 | Russell et al. |
| 2005/0177730 A1 | 8/2005 | Davenport et al. |
| 2005/0183032 A1 | 8/2005 | Bushey et al. |
| 2005/0268100 A1 | 12/2005 | Gasparini et al. |
| 2005/0268107 A1 | 12/2005 | Harris |
| 2006/0015742 A1 | 1/2006 | Camaisa et al. |
| 2006/0015743 A1 | 1/2006 | Camaisa et al. |
| 2006/0106605 A1 * | 5/2006 | Saunders et al. .............. 704/246 |
| 2007/0136517 A1 | 6/2007 | Edling |
| 2007/0136573 A1 | 6/2007 | Steinberg |
| 2007/0180496 A1 * | 8/2007 | Fransdonk ......................... 726/3 |
| 2007/0266257 A1 | 11/2007 | Camaisa et al. |
| 2008/0091682 A1 | 4/2008 | Lim |
| 2008/0114980 A1 | 5/2008 | Sridhar |
| 2008/0189776 A1 | 8/2008 | Constable |
| 2008/0201159 A1 | 8/2008 | Gabrick et al. |
| 2008/0250477 A1 | 10/2008 | Samuelsson et al. |
| 2008/0301570 A1 | 12/2008 | Milstead et al. |
| 2009/0094674 A1 | 4/2009 | Schwartz et al. |
| 2009/0259848 A1 | 10/2009 | Williams et al. |
| 2010/0100967 A1 | 4/2010 | Douglas et al. |

OTHER PUBLICATIONS

Rodry, "Cookie based authentication: is it secure ?", Published on Aug. 28, 2000, http://www.perlmonks.org?node_id=29928, Retrieved data Apr. 10, 2009.*

Rodry August; "Cookie based authentication: is it secure ?" Aug. 28, 2000; pp. 1-4; Retrieved Date: Jun. 20, 2010.*

David M. Piscitello, Lisa Phifer, "Best Practices for Securing Enterprise Networks", Business Communications Review Hinsdale: Dec. 2002, vol. 32, Iss. 12, p. 33 (6 pgs).

Camasia et al., "System and Method for Blocking Unauthorized Network Log in Using Stolen Password", File History for U.S. Appl. No. 10/892,584.

Camasia et al,, "System and Method for Blocking Unauthorized Network Log in Using Stolen Password", File History for U.S. Appl. No. 11/077,948.

Jonas Samuelsson, Allan Camaisa, "System and Method for Second Factor Authentication Services", Non-Final Office Action dated Dec. 9, 2010 of co-pending U.S. Appl. No. 12/142,232, filed Jun. 19, 2008.

Jonas Samuelsson, Allan Camaisa; "System and Method for Second Factor Authentication Services", Amendment filed Jan. 20, 2011 in response to Non-Final Office Action dated Dec. 9, 2010 of co-pending U.S. Appl. No. 12/142,232, filed Jun. 19, 2008.

Allan Camaisa, Jonas Samuelsson, "System and Method for Blocking Unauthorized Network Log in Using Stolen Password", Non-final Office action dated Jan. 10, 2011 from co-pending U.S. Appl. No. 11/824,694, filed Jul. 2, 2007.

Allan Camaisa, Jonas Samuelsson, "System and Method for Blocking Unauthorized Network Log in Using Stolen Password", Amendment filed Jan. 19, 2011 in response to Non-final Office action dated Jan. 10, 2011 from co-pending U.S. Appl. No. 11/824,694, filed Jul. 2, 2007.

Response to Office Action for U.S. Appl. No. 11/077,948, filed Jan. 4, 2011 (8 pages).

Response to Office Action for U.S. Appl. No. 11/077,948, filed Jan. 7, 2009 (4 pages).

Response to Office Action for U.S. Appl. No. 11/077,948, filed May 7, 2009 (4 pages).

Amendment and Response to Non-Final Office Action for U.S. Appl. No. 11/077,948, filed May 25, 2011 (14 paes).

Response to Office Action for U.S. Appl. No. 11/824,694, filed Jun. 25, 2010 (18 pages).

Amendment and Response to Final Office Action for U.S. Appl. No. 11/824,694, filed Jul. 1, 2011 (22 pages).

Response to Office Action for U.S. Appl No. 11/824,694, filed Dec. 2, 2010 (12 pages).
Response to Office Action for U.S. Appl. No. 11/824,694, filed Jan. 19, 2011 (14 pages).
Response to Notice of Non-Compliant Amendment for U.S. Appl. No. 12/142,232, filed Jan. 20, 2011 (8 pages).
Corrected Response to Office Action for U.S. Appl. No. 10/892,584, filed Nov. 4, 2009 (9 pages).
Amendment and Response to Final Office Action, for U.S. Appl. No. 12/142,232, filed Jul. 29, 2011 (11 pages).
Non-Final Office Action for U.S. Appl. No. 11/077,948, mailed Jan. 24, 2011 (10 pages).
Final Office Action for U.S. Appl. No. 11/077,948, mailed Dec. 7, 2010 (11 pages).
Non-Final Office Action for U.S. Appl. No. 11/077,948, mailed Jul. 16, 2009 (8 pages).
Rodry, "Cookie based authentication: is it secure?," http://www.perimonks.org?node.sub-id=29228, Retrieved data Apr. 29, 2009, published on Aug. 18, 2000 (4 pages).
Final Office Action for U.S. Appl. No. 12/142,232, mailed Mar. 29, 2011 (11 pages).
Non-Final Office Action for U.S. Appl. No. 12/142,232, mailed Dec. 9, 2010 (11 pages).
Final Office action for U.S. Appl. No. 11/824,694, mailed Mar. 1, 2011 (33 pages).
Non-final Office Action for U.S. Appl. No. 11/824,694, mailed Jan. 10, 2011 (30 pages).
Final Office action for U.S. Appl. No. 11/824,694, mailed Aug. 31, 2010 (42 pages).
Non-final Office Action for U.S. Appl. No. 11/824,694, mailed Jun. 10, 2010 (31 pages).
Non-final Office Action for U.S. Appl. No. 10/892,584, mailed Jul. 6, 2009 (19 pages).
Notice of Allowance for U.S. Appl. No. 10/892,584, mailed Dec. 29, 2009 (16 pages).
Amendment and Response to Non-Final Office Action for U.S. Appl. No. 11/824,694, filed Jan. 19, 2012 (31 pages).
Response to Non-Final Office Action for U.S. Appl. No. 12/142,232, filed Feb. 6, 2012 (10 pages).
U.S. Appl. No. 11/077,948, Notice of Allowance mailed Aug. 12, 2011 (11 pages).
U.S. Appl. No. 11/824,694, Office Action mailed Sep. 19, 2011 (27 pages).
U.S. Appl. No. 12/142,232, Office Action mailed Oct. 6, 2011 (13 pages).
U.S. Appl. No. 12/434,442, Office Action mailed Dec. 16, 2011 (10 pages).
U.S. Appl. No. 12/475,028, Office Action mailed Jan. 5, 2012 (12 pages).
U.S. Appl. No. 10/892,584—Camaisa et al.—Non-final office action dated Jul. 6, 2007.

* cited by examiner

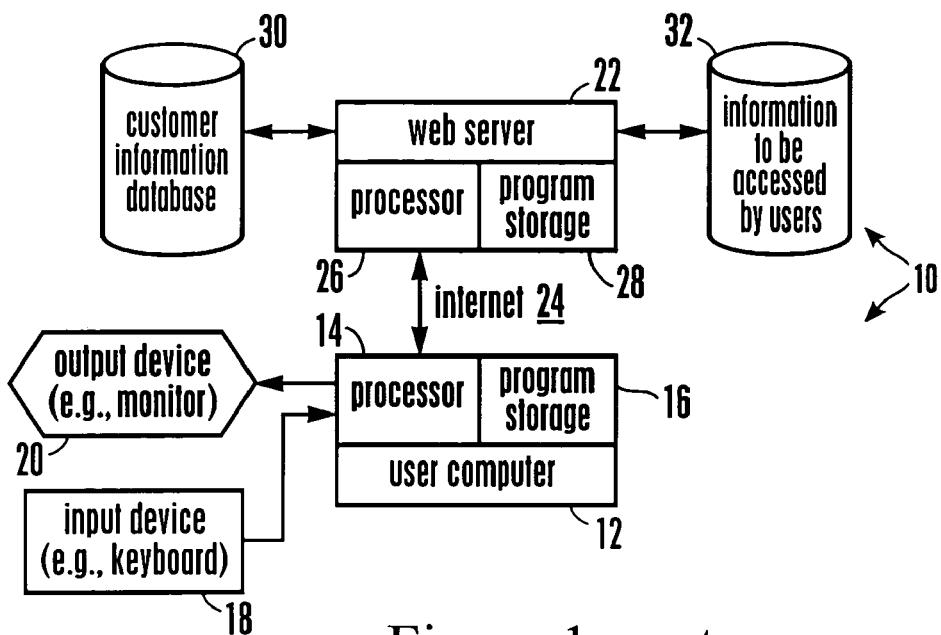
Figure 1 system
Figure 2 registration logic
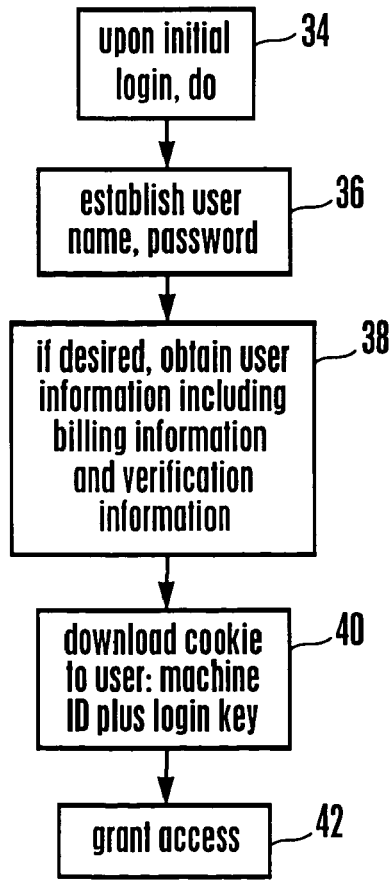

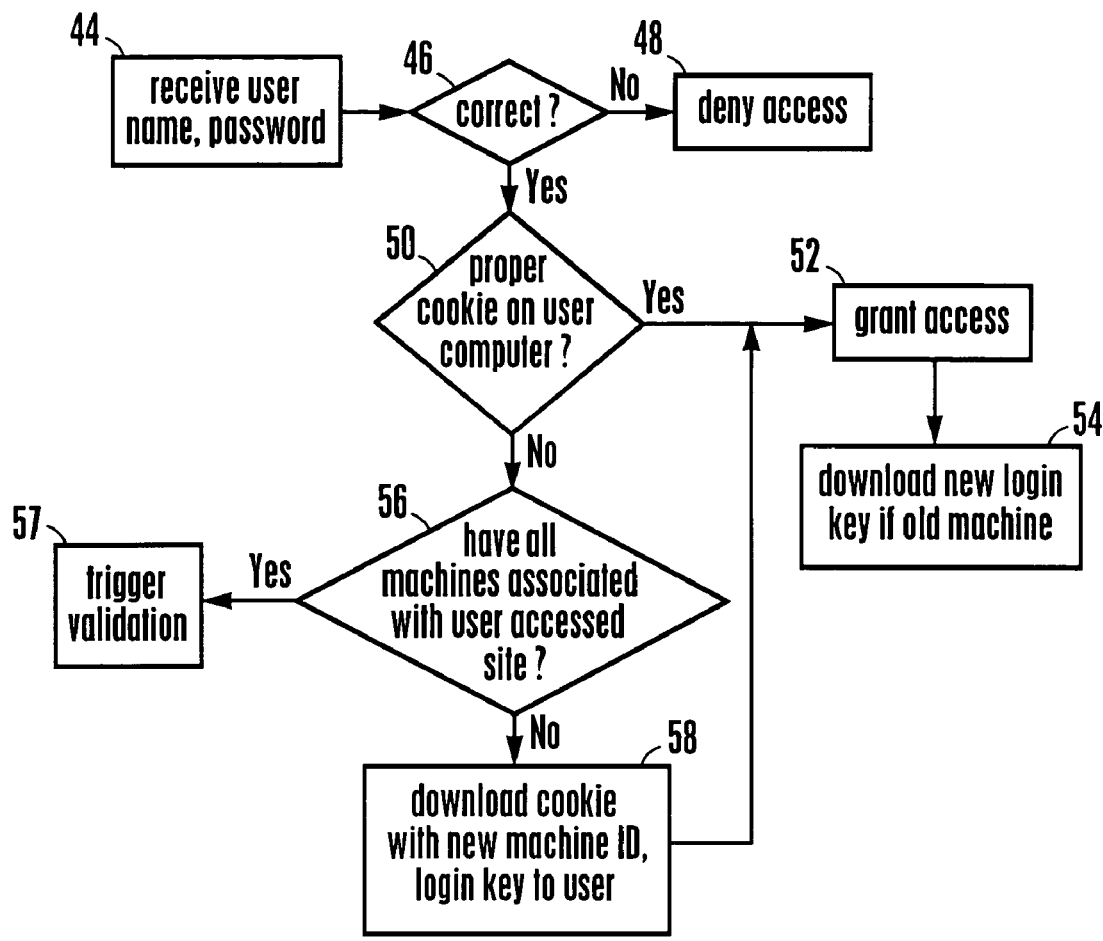
Figure 3   subsequent log-ins

SYSTEM AND METHOD FOR BLOCKING UNAUTHORIZED NETWORK LOG IN USING STOLEN PASSWORD

RELATED APPLICATIONS

This application is a continuation-in-part of and claims priority from co-pending U.S. patent application Ser. No. 11/077,948, filed Mar. 11, 2005, which in turn is a CIP of Ser. No. 10/892,584, filed Jul. 15, 2004, both of which are incorporated herein by reference.

I. FIELD OF THE INVENTION

The present invention relates generally to preventing unauthorized network log in using a stolen password.

II. BACKGROUND OF THE INVENTION

Passwords are a ubiquitous way to provide a minimal level of authentication to a computer user seeking to access a network computer such as a Web site. For instance, online banking requires a user to log in to a Web server of a financial institution using a user name and password that have been previously given to the user by the server. In this way, only a user (hopefully, the true account owner) who possesses both the user name and password can gain access to the user's account.

As another example, some Web servers provide subscription services. For instance, users can subscribe to a Web site to receive news publications, music titles, etc. To ensure that only users who have paid the subscription fee can access the content, a user seeking access is required to log in using a user name and password.

In either case, it is possible that a password can be stolen and information intended only for the rightful owner of the password consequently fall into the hands of a password thief. Some estimates for the year 2003 indicate that as many as two million Americans have had their online bank accounts raided, at an average loss of $1200 for a total loss in excess of $2 billion. A common way for thieves to gain access is to send official-looking emails to bank customers, requesting user names and passwords which, if the illegitimate requests are complied with, are then used to log in to online accounts and drain them of money. Having recognized the above problem, the solution herein is provided.

SUMMARY OF THE INVENTION

A method for selectively granting a user access to data includes receiving an IP address from a computer attempting to gain access to the data, and correlating the IP address to a geographic location. Based on the geographic location, it is determined whether to deny the computer access to the data.

The act of correlating may include accessing a database of IP addresses correlating IP addresses to geographic location such as country and/or state and/or city and/or postal code. If the geographic location is not approved, a challenge can be issued to the user of the computer and access is not denied only if a correct response to the challenge is received. The geo location logic may be undertaken in combination with determining whether a cookie previously deposited on the computer includes a machine ID matching a test machine ID and a login key matching a test login key, and if so, granting the computer access to the data, and refreshing the login key, otherwise not granting the computer access to the data absent additional authentication steps.

In another aspect, an authentication system for a user computer includes a server executing logic that determines whether to grant the user computer authentication based at least in part on the geographic location of the user computer.

In still another aspect, a method for authenticating a user of a computer to a server includes receiving from the computer biometric information representing the user, and using the biometric information, determining whether to issue a challenge to the user.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an exemplary system for implementing the present invention;
FIG. 2 is a flow chart of the registration logic;
FIG. 3 is a flow chart of the subsequent log in logic.

DETAILED DESCRIPTION OF THE PREFERRED EMBODIMENT

Figure 4:
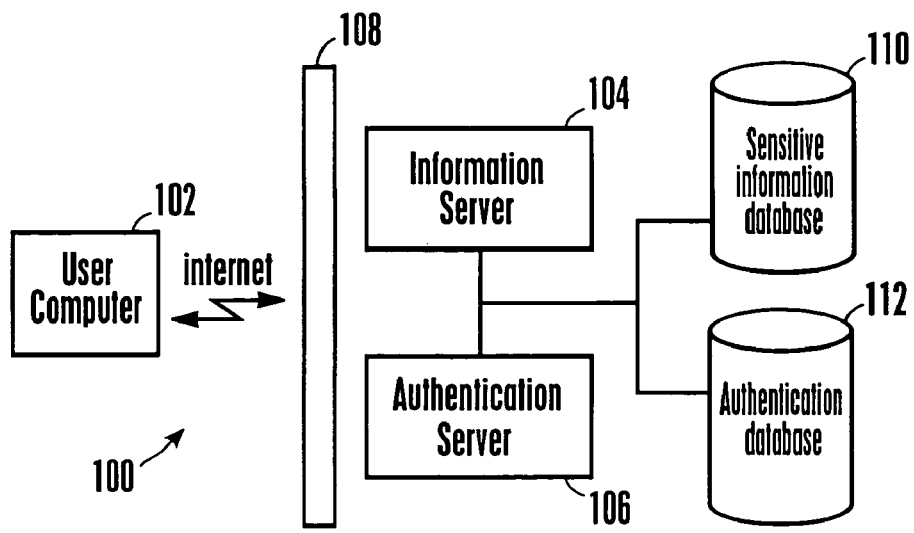
FIG. 4 is a block diagram of another non-limiting system.

Referring initially to FIG. 1, a system is shown, generally designated 10, that includes plural user computers 12 (only a single user computer shown for clarity) each of which can have a processor 14 and disk and/or solid state program storage 16 for storing software embodying logic. Also, each user computer 12 can include one or more input devices 18 such as keyboards, mice, voice recognition devices, etc. as well as one or more output devices 20 such as monitors, printers, other computers, etc. The authentication logic executed by the present system and discussed herein may be used in applications such as but not limited to online banking, secure online e-commerce, and VPN access control.

As shown in FIG. 1, the user computer 12 communicates with a Web server 22 over the Internet 24. The server 22 has a processor 26 and disk and/or solid state program storage 28 for storing software embodying logic including all or part of the logic discussed further below. The server 22 may access a customer information database 30 that contains the log in and registration information on users set forth further below, it being understood that the database can be pre-populated with user information on existing customers who elect to start up the present service. Also, the server 22 may access an information database 32 to supply users with desired information, e.g., bank account records, subscription content, etc. The databases 30, 32 may be implemented in a single data structure if desired.

Now referring to the initial registration logic of FIG. 2, commencing at block 34, the user logs in for the initial time. Moving to block 36, a user name and a password are established, for instance by allowing the user to select a user name and password or with the server 22 conferring a user name and password on the user. In block 38, additional user information can be obtained if desired. Such user information might include billing information and validation information. The validation information can be confidential to the user so as to protect his account from outside unwanted users who might have stolen the users account information, in accordance with further logic set forth below. It is to be understood that the validation information alternatively can be previously obtained from the user in various ways, online or off-line.

At block 40, at the same time the user registers or subsequently in the case of users who are already registered with the server for other purposes but now for the first time commence the present service, the user(s) computer is sent a verification string. The verification string is preferably but not necessarily one that does not require user interaction or special software, such as a cookie that can have a machine ID and a login key, e.g., a 4096 bit string with randomly generated value. The cookie may also have a user ID that is unique to a person. The cookie requires no special client software and is completely invisible to the user. Both the machine ID and the login key are randomly generated, stored on the server, and associated with that user's account. Once the users account is established, the machine ID and the login key become associated with that user's account. Access is granted if all user information and user account information is correct, shown in block 42.

After registration the logic that can be implemented by the server 22 moves to FIG. 3 for subsequent attempts by the user to log on to the server 26 and access the user information contained in the database 32 shown in FIG. 1. Beginning with block 44, upon subsequent logins the user enters the user name and password. At decision diamond 46, the server checks the user name and password's validity. If the user name and password are not correct, user access is denied at block 48.

If, at decision diamond 46, it is determined that the user name and password are correct, the logic flows to decision diamond 50 wherein the server checks the users computer to verify the correct cookie is stored on the user(s) computer by, e.g., comparing the cookie on the user's computer with server cookie records. If the server determines the cookie is present and correct, access to the user information in the database 32 is granted at block 52. Then, at block 54, assuming that the machine being used is not a newly entered machine as discussed further below in relation to block 58, a new login key carried on a new cookie preferably over an SSL encrypted link is downloaded. This new cookie with new login key is used for the next user login using the same machine. The login key in the new cookie is different from the login key of the old cookie but the machine ID stays constant.

In contrast, if, at decision diamond 50, it is determined that the cookie on the user computer is not correct, in some optional embodiments the server 22 moves to decision diamond 56 to determine whether all the computers that have been allocated to the user have accessed the server 22. In other words, in some applications such as online banking the server may allocate to the user at registration, in response to a user request, more than a single computer (i.e., to use N computers, N>1) to access the information in the database 32. For instance, an online banking customer might want to access his bank account from both an office computer and a home computer. If all of the AN@ allocated computers that have been allocated to the user have accessed the server 22 and have been granted cookies, meaning that the currently used computer is in excess of the authorized number, user access is denied and the logic flows to block 57 to trigger a validation process. If desired, to foil a dictionary attack only a limited number of login/cookie verification attempts may be allowed from any one machine, after which the machine is locked out until successful validation occurs.

In a non-limiting implementation, the validation process can include the user entering the confidential information initially given in the initial login process. The validation information can be the users mothers maiden name, the users social security number, or some other information that preferably is personal to the user. The server 22 then checks the user input against the validation information that was gathered at block 38 in FIG. 2. If a match is found, validation is successful and the user is granted access; otherwise, validation is unsuccessful and access is denied.

In some implementations the validation process can include sending an email to the user. The email can contain a hyperlink to a Web site at which a new cookie that is valid for accessing the data may be obtained. If desired, access to the Web site at which a new cookie may be obtained can be disabled after the user clicks once on the hyperlink. Or, the validation process can include prompting the user to call a telephone number to verify predetermined information, or to access a Web site to verify predetermined information online. Once validation is successful, the server 22 permits access to the information in the database 32.

In contrast, if the server determines at decision diamond 56 that not all machines that have been allocated have accessed the server 22, a new cookie with a new machine ID and login key is downloaded to the new computer at block 58. The logic then loops back to block 52 to grant access, in some embodiments only after having triggered the validation first as described at block 57 to ensure that the correct user is logging in.

In the context of adding a new machine when more than a single user computer is authorized, the new machine can be automatically added at its first login in accordance with the logic above (assuming the above-described conditions have been met), or the server can ask the user of the new machine whether the new machine is to count as one of the "N" authorized machines, temporarily or otherwise. If the user indicates that the machine is to be temporary only (e.g., if the user is operating a terminal at a hotel), the user could specify an expiration date and/or number of logins after which any access to the user information from that machine would be denied, or at the least would trigger the verification process once again. This can be done by causing the cookie to be designated "expired" at the end of the period. For instance, at an in-hotel room terminal, a user might specify an expiration at the expected check out time, or a user could specify a number of logins to allow from that machine before the verification process is triggered again. The expiration information is stored at the server. When a machine expires, the number of new machines remaining to be added to the user's account may be reset by one. In contrast, the user would not be asked for temporary use information when communicating with the server from a core set of computers from which the user has authorized permanent access. One or more pieces of the above information that is transmitted between computers may be encrypted using, e.g., triple DES encryption.

Figure 5:
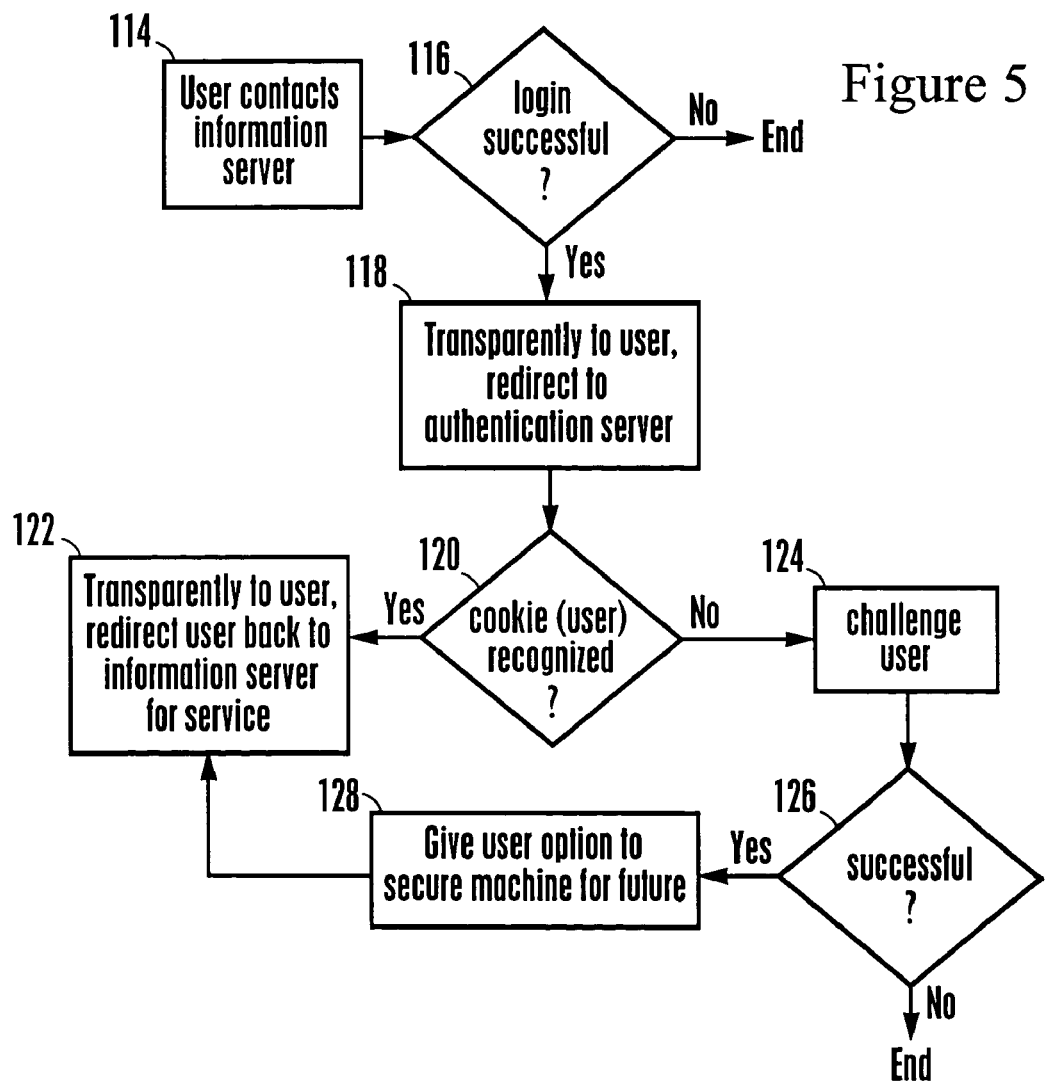
FIG. 5 is a high level flow chart of the logic used by the system shown in FIG. 4.
Figure 6:
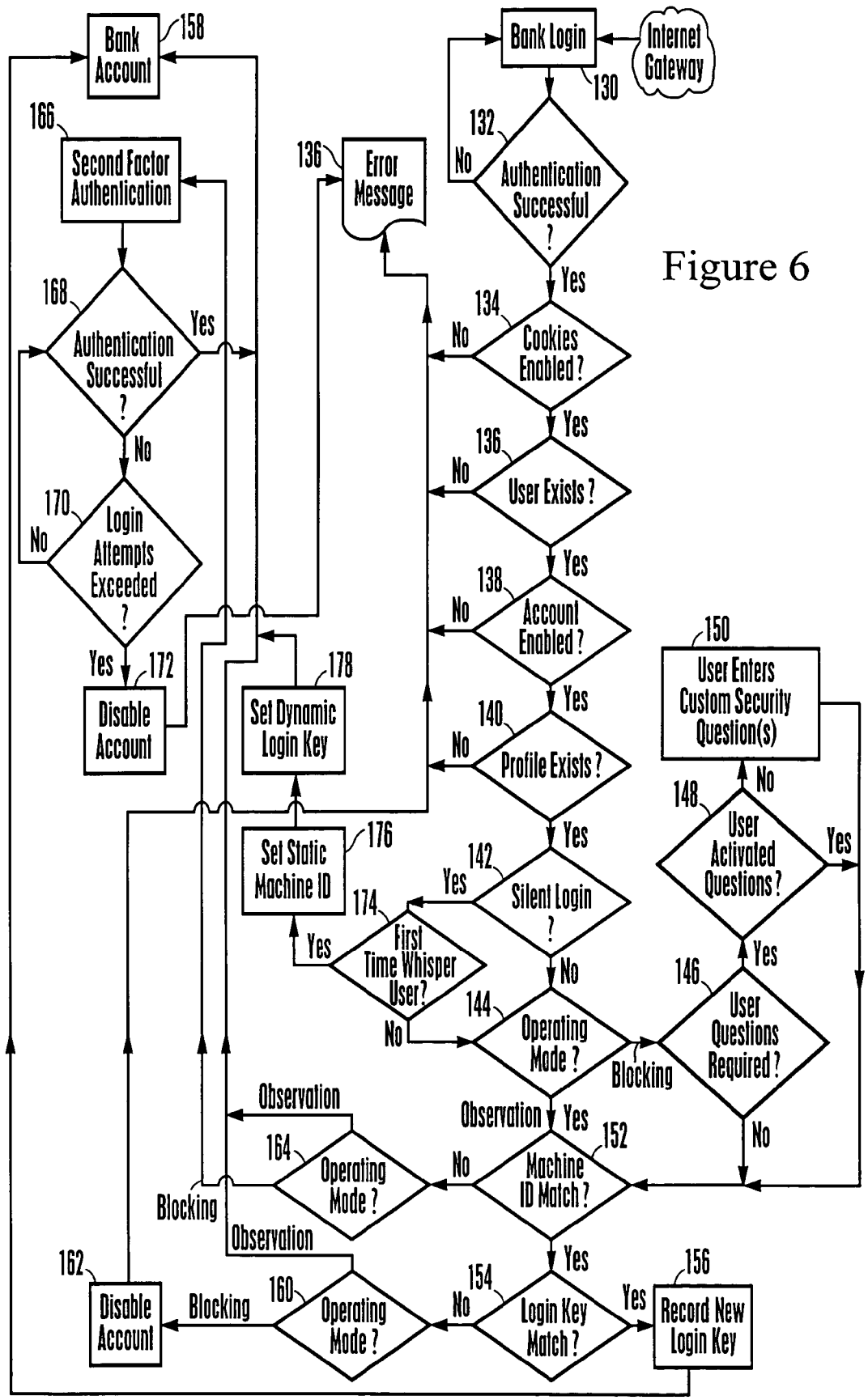
FIG. 6 shows greater details of the logic shown in FIG. 5.

FIGS. 4-6 show specific preferred implementations of the above logic and system. For simplicity, FIG. 4 omits certain details such as input devices and output devices. A preferred system 100 can include one or more user computers 102 that communicate via the Internet with, e.g., an information server 104 of a financial institution. The information server 104 communicates with an authentication server 106. Both the servers 104, 106 preferably are behind a firewall 108. While only a single information server 104 and only a single authentication server 106 are shown, it is to be understood that server clusters can be used. For instance, J2EE clusters that use memory replication session persistence can be used, where individual objects in the Httpsession are serialized to a backup server as they change, providing high performance and scalability. Also, when the authentication server 106 is behind the firewall 108, the use of secure socket layer (SSL) may not be necessary, although if access is required from an Extranet, SSL may be used.

In any case, the purpose of the system 100 is to permit controlled access of the user computer 102 to data in a sensitive information database 110, using authentication information in an authentication database 112. The information server 104 and sensitive information database 110 may be the conventional server/database used by, e.g., a financial institution, with the exceptions noted below. In contrast, the authentication server 106 and authentication database 112 may be add-ons in accordance with present principles. In any case, the databases herein may be, e.g., SQL servers, DB2 servers, Oracle servers, or lower end servers such as MySQL.

The logic of a preferred implementation of the logic is shown in FIGS. 5 and 6. While any appropriate software architecture may be used, in one implementation the object-oriented "Struts" framework of Apache Software Foundation may be used, wherein client requests to the information server 104 are cached and passed to the required business action as defined in the Struts configuration file. The XSD validation process may then be used to provide open data validation rules. The "View" is presented in a single JSP main page that uses XSL and XML to display the various page parts. The XSLT and XML provide full separation between presentation, business, and data layers. Further details of this particular version of J2EE design are known in the art and will be omitted for clarity.

FIG. 5 shows a high level logic flow that may be implemented by the system 100 shown in FIG. 4. Commencing at block 114, the user contacts the information server 104 using the user computer 102. This contact usually entails an initial authentication such as a login process that includes entering a user name and password. If the login process fails at decision diamond 116 the logic ends, but if it is successful the present invention proceeds to block 118, wherein user computer communication, transparently to the user, is transferred to the authentication server 106. Communication between the servers 104, 106 may use SOAP principles known in the art.

At the authentication server 106, it is determined at decision diamond 120 whether the machine is recognized (using the machine ID in the above-disclosed cookie) and has been previously secured by the user (using the login key). This can be thought of as a secondary authentication process. If the test passes, the logic moves to block 122 to (transparently to the user) transfer the user back to the information server 104 for further service, e.g., for online banking transactions. On the other hand, if the test at decision diamond 120 fails, the logic can move to block 124 to challenge the user in accordance with principles set forth herein, which challenge might be thought of as a tertiary authentication process. For instance, an email or wireless telephone short message service (SMS) message can be sent to the user, containing a randomly generated single-use only personal identification number (PIN) code which is supplied by the authentication server 106. This single-use PIN code can then be sent by the user to the authentication server 106 using the user computer 102, to prove that the user is authorized access.

If the challenge is met successfully at decision diamond 126, the user is given the option at block 128 of securing the specific machine being used for future use, and then the user is redirected to the information server at block 122. Otherwise, the process ends without giving the user access.

FIG. 6 shows portions of a detailed non-limiting implementation of the logic shown in FIG. 5. Commencing at block 130, the user attempts the above-described login with the information server 104. If this is not successful at decision diamond 132, the logic loops back to block 130, but as disclosed above when the initial login with the information server 104 is successful, the logic, transparently to the user, is taken up by the authentication server 106 to determine, at decision diamond 134, whether the user computer 102 has disabled cookies. If cookies are disabled an error message is returned at state 136.

If the user has not disabled the cookie acceptance function, however, the logic flows from decision diamond 134 to decision diamond 138 to determine whether the user exists in the authentication database 112 as determined by, e.g., the user ID resident in the authentication cookie or by the user name used at block 130. If not, an error message is returned. Otherwise, the logic flows to decision diamond 138 to determine whether the user's account is enabled. This is done by checking a flag in the authentication database 112 indicating whether the user's account is enabled or disabled. If no account has been enabled for the user, an error message is returned, but otherwise the logic moves from decision diamond 138 to decision diamond 140 to determine whether a user profile exists.

By "user profile" is meant a factor associated with the user that indicates whether and what type of challenge is posed to the user if further authentication is required. In other words, the profile associated with a user determines what the user must provide to prove identity and thus, to gain access to the user account. This determination is made by checking whether the profile ID associated with the user in a users table in the authentication database 112 corresponds to a record in a profile table in the database. If no profile exists for the user, an error message is returned. When a profile exists, however, the logic flows to decision diamond 142 to determine whether the institution being served (e.g., a bank operating the information server 104) has instituted what might be though of as a "silent" login protocol. If this protocol has not been implemented, the logic moves to decision diamond 144 where it branches depending on the operating mode, again defined by the institution. In a "blocking" mode the logic moves to decision diamond 146 to determine whether user authentication questions are required. If so, the logic moves to decision diamond 148 to determine whether the user has activated questions. By "activating questions" is meant that the user has provided self-defined security questions and answers in the past (which test thus proves false only on first-time login), after which the user is not asked to provide or answer questions again absent the need for tertiary authentication. If the user has not activated questions, the user is prompted to answer institution-defined questions at block 150.

After block 150 or when no user questions are required, or if they are and the user has activated them, the logic flows to decision diamond 152 where it is determined whether the machine ID in the user's cookie matches the ID resident in the authentication database 112. If the machine ID matches, the logic next determines, at decision diamond 154, whether the above-described login key in the cookie matches the corresponding value in the authentication database 112, and if a match is found, a new login key is generated, recorded at block 156, and a new cookie constituted and sent to the user in accordance with prior disclosure. The user is then authenticated for, e.g., accessing the information server 104/information database 110 at block 158. The information server is notified of successful authentication and user computer communication is transferred back to the information server.

If the login key test fails at decision diamond 154, the logic moves to decision diamond 160 where it branches depending on the mode. In the blocking mode, the user's account is disabled at block 162 by appropriately setting the above-mentioned flag in the authentication database 112, and an error message is returned. However, in the observation mode the user is allowed to access his or her account at block 158.

Recall that at decision diamond 152 a machine ID test was undertaken. If the test fails, the logic moves to decision diamond 164 where it branches depending on the mode. In the blocking mode, the logic moves to block 166 to initiate second-factor authentication, e.g., the challenge discussed above in reference to FIG. 5. Instead of invoking the cell phone-delivered PIN method described above, the user can be asked the questions and the user's answers compared to those that were established at block 150. In any case, at decision diamond 168 it is determined whether the challenge was successfully responded to by the user, and if so account access is granted at block 158. Otherwise, the logic moves to decision diamond 170 to determine whether a predetermined number of login attempts has been made, and when the threshold is violated the user's account is disabled at block 172, and an error message is returned. However, in the observation mode at decision diamond 164 the user is allowed to access his or her account at block 158.

Recall that at decision diamond 142 it is determined whether the "silent" login feature is implemented. If it is, the logic moves to decision diamond 174 to determine whether the user, based on, e.g., the user name entered at login at block 130, is a first time user. If not, the logic flows to decision diamond 144 to operate as previously described. However, if the user is a first time user the logic moves to block 176 to establish the static machine ID discussed above, and then to block 178 to establish the one-time dynamic login key. Access is then granted at block 158.

Thus, in the silent login mode the user, once logged in for the first time with the information server 104, is automatically given the present authentication cookie (pending successful tests at decision diamonds 134-140), the login key portion of which is refreshed each time the user accesses his account. With respect to operating mode, in the observation mode the user is given access to his or her account regardless of cookie matches, whereas in the blocking mode higher security is enabled in accordance with the logic above.

Figure 7:
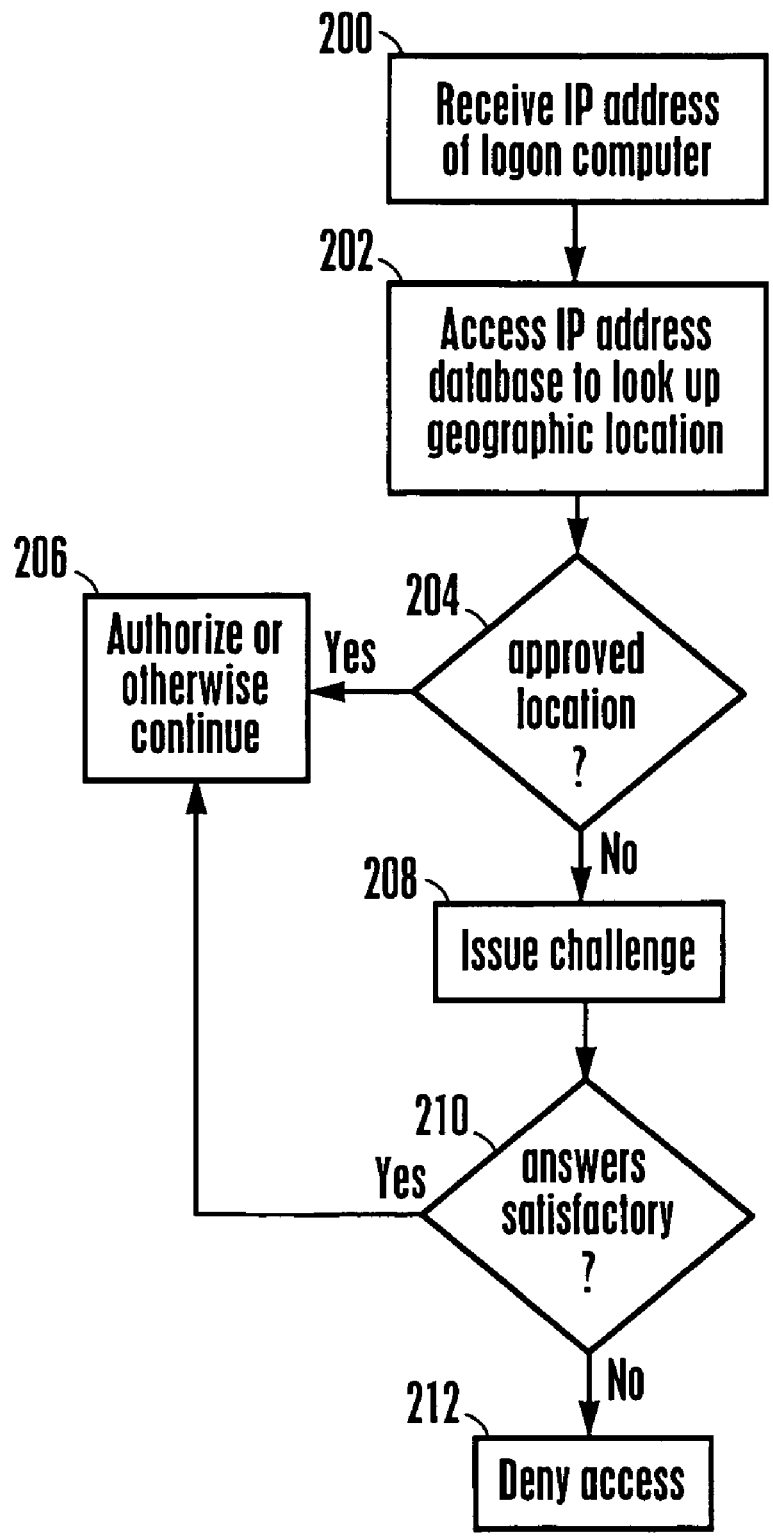
FIG. 7 is a flow chart of geographic location validation logic.

Now referring to FIG. 7, in addition to (e.g., at any convenient point in the logic) or indeed in lieu of the logic of FIG. 6, geographic location can be used to determine whether to challenge a user to provide additional authentication information. In the example shown in FIG. 7, the IP address of a computer attempting to gain access is received by the authentication server, which accesses a database of IP addresses at block 202 that correlates IP addresses to geographic location, typically country, state, city, and postal code. Other examples of geographic location can be ISP (since the ISP has a location related to the user attempting to log on), and time zone. In addition, geographic location can be tied to a location type, e.g., a cyber cafe. In any case, the database may be obtained from or operated by an independent entity. Using the IP address as entering argument, the geographic location associated with the IP address is obtained.

Proceeding to decision diamond 204, it is determined whether the geographic location, e.g., country and/or state and/or city and/or postal code and/or time zone and/or ISP identity and/or location type, e.g., a cyber cafe, is an approved location. This determination may take on several facets. For example, a list of "disapproved" locations may be implemented, and if the looked-up geographic location is not on the list, the test at decision diamond 208 is positive. Or, a list of only approved locations may be implemented, and only if the looked-up geographic location is on the list is the test at decision diamond 206 positive. Yet again, a combination of the two lists may be used, so that, for example, entire countries may be placed on a "disapproved list" and if the geographic location is not on the "disapproved" list, the logic accesses an "approved list" to determine, e.g., whether the particular postal code is an approved postal code or not.

One non-limiting way to determine whether a location should be approved or not is to observe the IP addresses associated with failed log in attempts and note whether a disproportionate number of failed attempts comes from IP addresses associated with a particular location.

If the geographic location is approved, access authorization is granted at block 206. In the alternative, depending on where the logic of FIG. 7 is implemented in conjunction with other authentication logic, e.g., depending on where the geographic location logic is inserted into the flow of FIG. 6, the remaining authentication process is allowed to proceed.

In contrast, if the geographic location is not approved, the logic may simply end without granting access, but more preferably the logic flows to block 208 to issue a challenge such as one of the above-mentioned challenges. The user's response to the challenge is tested at decision diamond 210 for sufficiency, and if the user successfully responds to the challenge the logic loops back to block 206. Otherwise, access is denied at block 212.

In addition to using geographic location as a test, biometric information may be used. For example, the logic of FIG. 7 may replace the geographic location test with a biometric test, e.g., to determine whether the user's voice as might be received over a VOIP connection matches an approved voice. A successful match may precipitate access authorization or at least permission to undertake the remaining logic of FIG. 6, for instance. Other biometric tests such as eye recognition or fingerprint recognition may be used.

While the particular SYSTEM AND METHOD FOR BLOCKING UNAUTHORIZED NETWORK LOG IN USING STOLEN PASSWORD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for selectively granting a user access to data, comprising:

responsive to receiving a user name and a password that are valid from a user computer associated with the user, determining, by a server comprising a processor, that a cookie previously deposited on the user computer includes (i) a machine ID that matches a test machine ID and (ii) a login key that matches a test login key;

receiving an IP address from the user computer;
correlating the IP address to a geographic location for the user computer and determining a type of geographic location based on the IP address;
responsive to determining that the geographic location is an approved geographic location and that the type of geographic location is an approved type of geographic location, granting the user computer access to the data;
depositing a new cookie on the user computer to replace the cookie, wherein the new cookie comprises the machine ID and a new login key.

2. The method of claim 1, wherein correlating the IP address to the geographic location comprises accessing a database of IP addresses correlating IP addresses to geographic locations.

3. The method of claim 1, wherein the geographic location is a country.

4. The method of claim 1, wherein the geographic location is a state.

5. The method of claim 1, wherein the geographic location is a city.

6. The method of claim 1, wherein the geographic location is a postal code.

7. The method of claim 1, further comprising:
responsive to at least one of (i) determining that the geographic location is an unapproved geographic location or (ii) determining that the type of geographic location is an unapproved type of geographic location, outputting a challenge to the user of the user computer;
responsive to receiving a correct response to the challenge, granting the user computer access to the data; and
responsive to receiving an incorrect response to the challenge, preventing the user computer from accessing the data.

8. The method of claim 1, further comprising:
receiving from the user computer biometric information representing the user; and
using the biometric information, determining whether to issue a challenge to the user.

9. The method of claim 1, further comprising determining that the geographic location is an unapproved geographic location unless the geographic location is listed on a list of approved geographic locations.

10. The method of claim 1, further comprising determining that the geographic location is an unapproved geographic location when the geographic location is listed on a list of disapproved geographic locations.

11. The method of claim 1, wherein determining that the geographic location is the approved geographic location comprises:
accessing a regional disapproved list of geographic locations and a local list of approved geographic locations; and
determining the geographic location is the approved geographic location if the geographic location is listed on the local list of approved geographic locations and on the regional disapproved list of geographic locations.

12. The method of claim 1, wherein the geographic location comprises:
an identification of a political boundary in which the user computer is positioned; and
an identification of the type of geographic location within the political boundary in which the user computer is positioned.

13. The method of claim 1, wherein the type of geographic location comprises a cyber cafe.

14. A server comprising:
a computer processor; and
a program storage comprising logic stored thereon, wherein the logic, when executed by the computer processor, is configured to cause the server to:
respond to receiving a user name and a password that are valid from a user computer, by determining that a cookie previously deposited on the user computer includes (i) a machine ID that matches a test machine ID and (ii) a login key that matches a test login key;
determine (i) a geographic location for the user computer and (ii) a type of geographic location for the geographic location, based on an IP address from the user computer;
respond to determining that the geographic location is an approved geographic location and that the type of geographic location is an approved type of geographic location by granting the user computer access to the data;
deposit a new cookie on the user computer to replace the cookie, wherein the new cookie comprises the machine ID and a new login key.

15. The server of claim 14, wherein the geographic location comprises:
an identification of a political boundary in which the user computer is positioned; and
an identification of the type of geographic location within the political boundary in which the user computer is positioned.

16. The server of claim 14, wherein the type of geographic location comprises a cyber cafe.

17. The server of claim 14, wherein the logic is configured to cause the server to determine that the geographic location is the approved geographic location by:
accessing a regional disapproved list of geographic locations and a local list of approved geographic locations; and
determining the geographic location is the approved geographic location if the geographic location is listed on the local list of approved geographic locations and on the regional disapproved list of geographic locations.

18. The server of claim 14, wherein the logic is configured to cause the server to:
respond to determining that at least one of (i) the geographic location is an unapproved geographic location or (ii) the type of geographic location is an unapproved type of geographic location, by outputting a challenge to the user of the user computer;
respond to receiving a correct response to the challenge by granting the user computer access to the data; and
respond to receiving an incorrect response to the challenge by preventing the user computer from accessing the data.

19. The server of claim 14, wherein the geographic location is at least one of:
a country;
a state;
a city; or
a postal code.

* * * * *